Oct. 23, 1962  G. M. MACK  3,059,593
ADJUSTABLE CARGO RETAINER
Filed June 18, 1959  5 Sheets-Sheet 1

INVENTOR.
GEORGE M. MACK
BY

Oct. 23, 1962  G. M. MACK  3,059,593
ADJUSTABLE CARGO RETAINER
Filed June 18, 1959  5 Sheets-Sheet 2
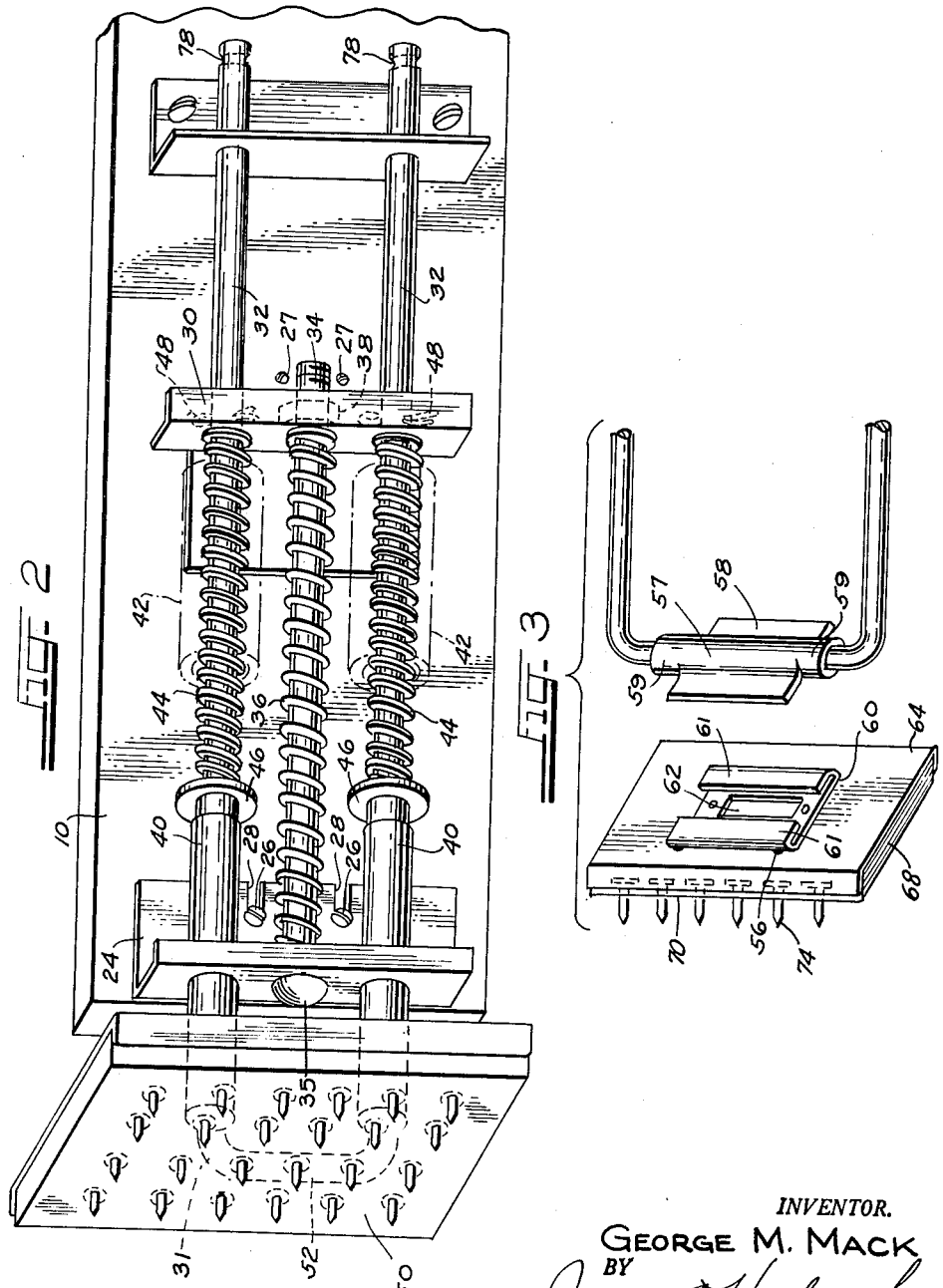
INVENTOR.
GEORGE M. MACK Oct. 23, 1962  G. M. MACK  3,059,593
ADJUSTABLE CARGO RETAINER
Filed June 18, 1959  5 Sheets-Sheet 3
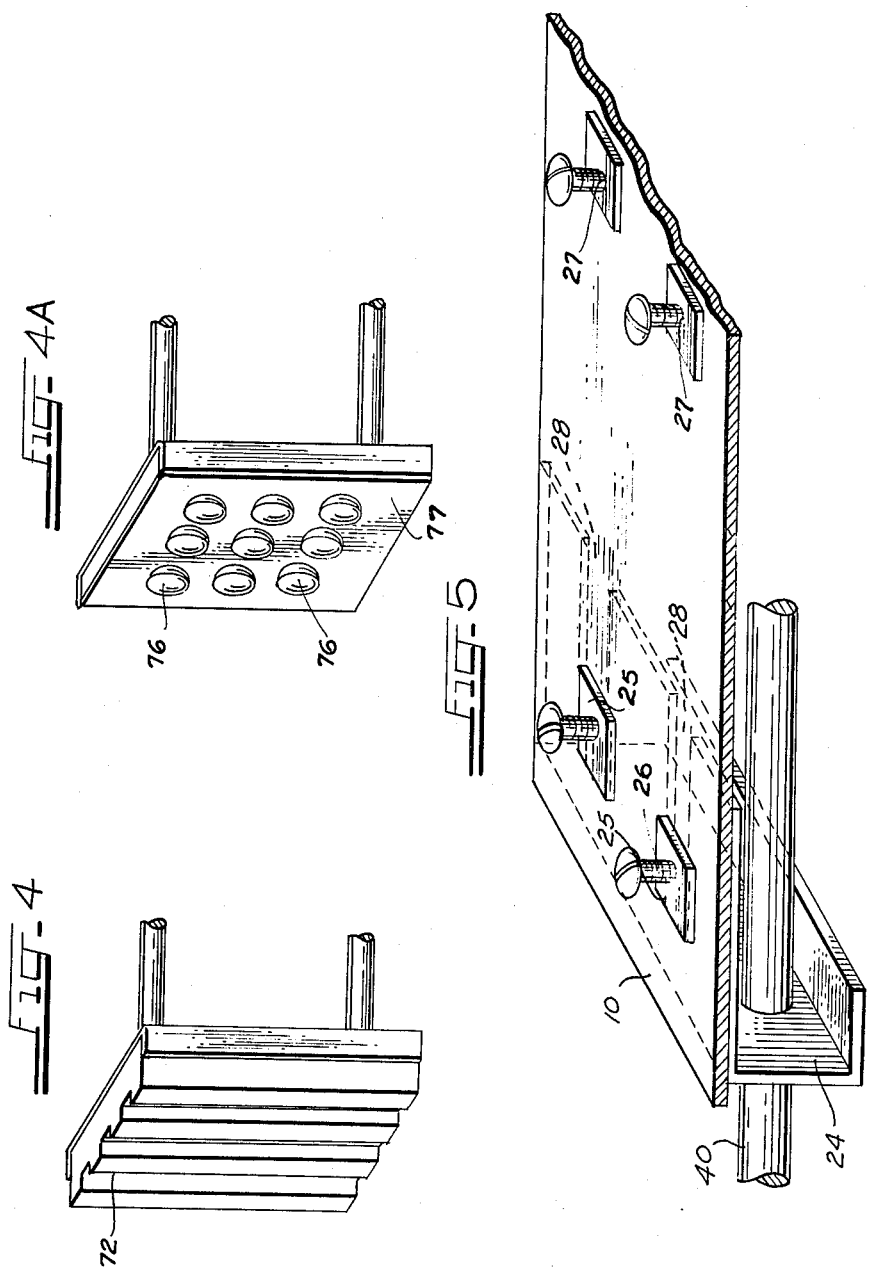
INVENTOR.
GEORGE M. MACK

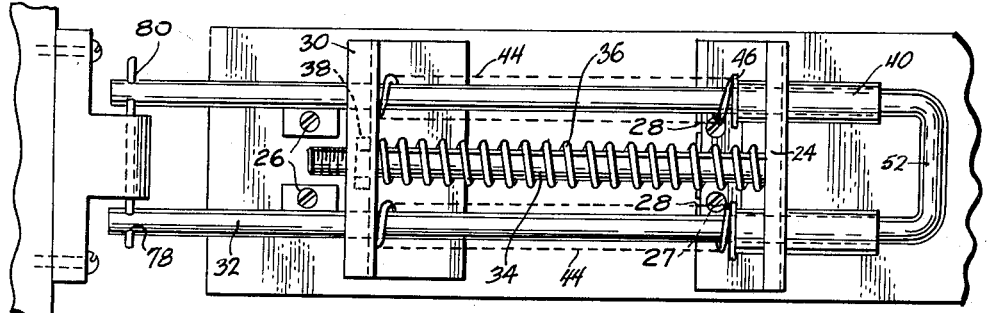
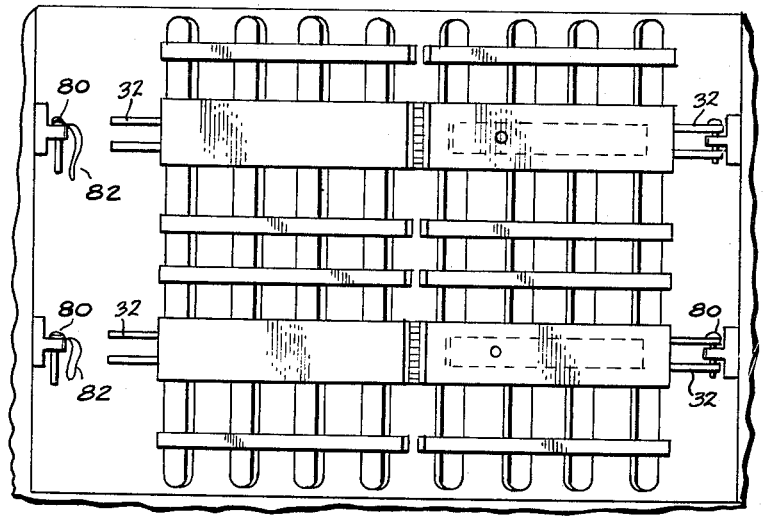
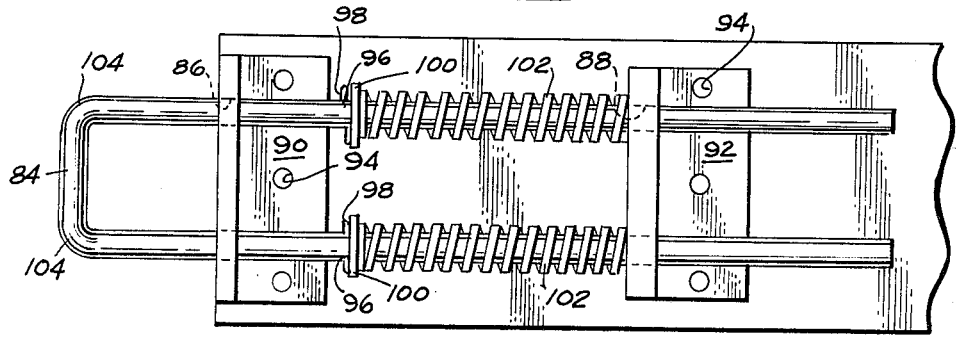

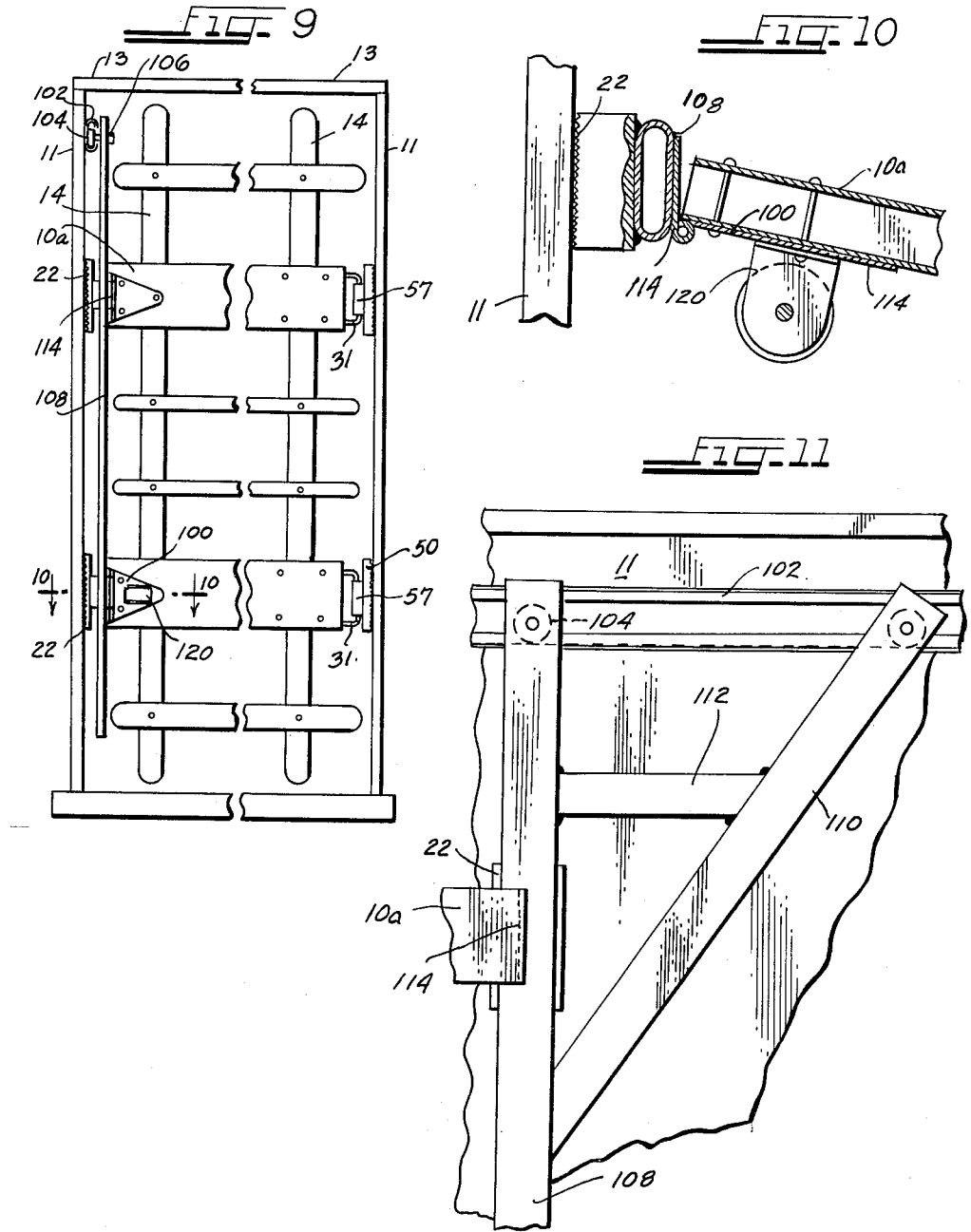

United States Patent Office 3,059,593
Patented Oct. 23, 1962

3,059,593
ADJUSTABLE CARGO RETAINER
George M. Mack, Rte. 1, Box 138, Delavan, Wis.
Filed June 18, 1959, Ser. No. 821,220
6 Claims. (Cl. 105—369)

This invention relates to an adjustable toggle acting folding bar or gate which may be used with a portable bulkhead to brace and partition cargo in the cargo compartments of railway cars, boats, aircraft, motor vans and the like. It is also designated to support platforms or decks in such cargo holds.

A number of adjustable struts and telescoping or folding bars have been employed in motor vans and railway cars for bracing or supporting cargo. Most of these employ brackets or rails attached to the walls of the cargo compartments for support at both sides, or are compression tightened after they are placed in position, as by jacks or turnbuckles. The wall engaging members have stiff, hard or sharp elements to withstand high pressures involved if engagement with the walls is frictional.

It has proven to be expensive to equip cargo compartments with suitable wall brackets or rails and very few cargo compartments are so equipped. Therefore folding bars and struts equipped with feet are generally used without such wall brackets, and unless over extended enough to bulge the side walls enough to allow for wall sway or movement, it is common for these to fall down during cargo movement. In motor vans particularly, road shocks and cargo surge tend to push out momentarily the relatively flexible wall portions of the cargo compartment and this is enough to loosen the conventional brace that is pre-adjusted to a given length and force between the cargo compartment walls under stress. Such wall movement repeatedly increases and decreases the distance between walls. In a large motor van this can amount to several inches or more, and when the walls move outwardly away from the ends of the brace, even spiked feet at the ends of the brace cannot prevent the brace from falling. Over extension sufficient to overcome this danger progressively damages the walls.

Where cargo is carried in trucks which are placed on railroad cars as in the "piggy back" system, the train is permitted a take-up speed of seven miles per hour in starting, and a railroad car may be jerked from a full stop to seven miles per hour almost instantaneously or vice versa. Such acceleration shocks can cause a mass shifting of the cargo in the piggy back truck which can easily move the walls outwardly enough to dislodge the feet of the usual toggle acting bracing bar. The frequent occurrence of such brace failures occasioned this invention, one of the objects of which is to provide a brace having all the advantages of solid compression bracing but having spring loaded feet which are free to expand outwardly as the walls move outwardly thereby retaining a firm grip on the walls with their excursions without damage to wall or its construction.

More particlularly an object is to provide a brace with spring loaded side wall engaging elements which under stress may compress or extend a predetermined distance and then bottom solidly, such bottoming taking place at the exact point when the brace is disposed fully in working position so as to prevent the possibility of the brace being unlawfully jimmied or pried free of either wall against the spring loading when the brace is locked.

Another object is to have the points at which such bottoming takes place adjustable, whereby the brace can be adjusted to accommodate various widths of cargo compartments.

In addition, an object of this invention is to provide such a brace with several types of easily interchangeable gripping feet such as feet containing spikes, preferably embedded in rubber feet equipped with suction cups etc., so that a good grip will be obtained on the walls of the cargo compartment whether such walls are of wood, smooth metal or other material.

A further object is to provide an attaching means which will allow ready removal and replacement of the feet but which will prevent malicious removal of the feet when the brace is in position in the cargo compartment.

In addition, an object of this invention is to provide a bracing bar of a construction such that when one or more brace bars are attached to a partition for retaining cargo, the partition may be made to fold in or near the middle along a vertical axis and when so folded no part of the bar will extend beyond the contour of the folded partition sections, it being preferred also to support the partition assembly on one of the side walls for ease in handling and storage and in the operation of the device.

Another object is to provide a folding bracing bar with interchangeable wall engaging elements with the resilient adjustment mechanisms reversible for applying tension as well as compression forces selectively upon the bar in its working position.

Another object is to provide a means for floating the spikes in the mounting of the pressure feet so that the spikes are resiliently mounted to resist shocks and among themselves can adjust to slightly different surface levels or contours while distributing the total work load thereon substantially evenly among all.

Another object is to provide a means for readily partitioning off a section of a refrigerated cargo space by the use of a thermal insulated or insulatable partition in conjunction with the disclosed invention so that only the necessary areas of a cargo space need be refrigerated.

Another object is to utilize the insulated compartments obtainable by the use of this invention in conjunction with thermal partitions so that Dry Ice or ice may be utilized to refrigerate such compartments.

Another object is to provide a bracing bar of a construction such that it may be used to support a shelf as well as a partition wall.

Another object is to provide partitions used with a bracing bar and to so mount the partitions that they abut when the bracing bar is in working position, thereby preventing the bracing bar from bending beyond the fully straightened position and forcing the hinge.

Another object is to provide in a reversible adjustment mechanism as described projecting pins suitable for hinging one or the other end of such bar so as to support a folding gate.

A further object is to provide in a folding bracing bar a lockable slide bar which may be extended across the working hinge or pivotal axis of the bar when the bar is in working position, thus constraining the bar in a straightened position and permitting padlocking of the bar and partition.

Another object is to provide in an adjustable bracing bar a window to provide access for the adjustment of an adjusting nut preferably before application and including a measuring scale on the border of the window so that the bar may be present to any given cargo compartment dimension.

A further object is to provide a flange abutting the side of the adjusting nut and so arranged that once the bar is placed and locked, no further adjustment of the nut is possible, thereby preventing tampering and load pilfering.

A further object is to provide a spring loading adjustment which provides constant working conditions regardless of its adjusted position.

These and other objects of the invention will be apparent from the ensuing description and the appended claims.

The cargo retainer may be broadly stated to comprise a folding bar which can be set up behind the cargo in a trailer, aircraft, ship or the like and then straightened like a toggle so that the two ends of the unfolded arms bear outwardly against both side walls of the cargo space. Generally, two or more such bars are used in parallel and lattice or other partition is attached to them, forming a wall across the cargo space to hold or seggregate cargo. Such a partition may be folded and stored against one wall of the cargo space either in loose or supported relationship when not in use or it may be installed adjacent the end wall of the cargo space and locked to serve as a back gate as well as prevent its removal. The outer ends of the folding bar are equipped with feet provided with resiliently held or embedded spikes, pads, suction cups or the like, and at least one of the feet is in turn slidably received in the end of the bar on a U-shaped support. The slidably mounted feet are spring urged outwardly and if heavily loaded as when the bar is straightened into place, the supports bottom or "go solid" against the adjustment mechanisms at the ends of the bar. A slide is provided which can be extended across the hinge and held in working position when the bar is straightened and thereby prevent the bar from folding. The slide may be padlocked in this position if desired.

In refrigerated or iced cargo space it is generally desirable to confine the refrigeration or ice to the smallest possible area. Hence it is useful to employ this invention in conjunction with thermally insulated panels covered with glass wool, so that the cargo and refrigeration may be confined to an insulated area of the minimum size, thereby realizing great savings in refrigeration costs and permitting refrigerated and non-refrigerated cargo to be shipped in the same cargo hold. Moreover, the partitions thus employed may be used either as walls or thermal shelves to isolate the cargo anywhere in the cargo space.

The invention is exemplified in the following description and illustrated by way of example in the accompanying drawings in which:

FIG. 2 shows the adjustment and tensioning mechanism;

FIG. 3 shows the spring clip means of attaching a foot to the bar;

FIGS. 3, 4 and 4a show several types of feet;

FIG. 5 shows the attachment of the adjusting mechanism to the bar to permit the mechanism to be easily removed, turned around and replaced in the bar in a reversed direction;

FIG. 6 shows the adjustment mechanism installed in the bar in a reverse direction and used with a cargo wall fitting;

FIG. 7 shows partitions used with two bars to be supported tensionally by hinge pins and fittings on the cargo space walls;

FIG. 8 is a view similar to FIG. 2 showing a modification of the tension device;

FIG. 9 is a view similar to FIG. 1 fragmented to show another form of the invention;

FIG. 10 is a sectional view taken on lines 10—10 in FIG. 9; and

FIG. 11 is a side elevational view of the preferred support for the embodiment shown in FIG. 9.

Figure 1:
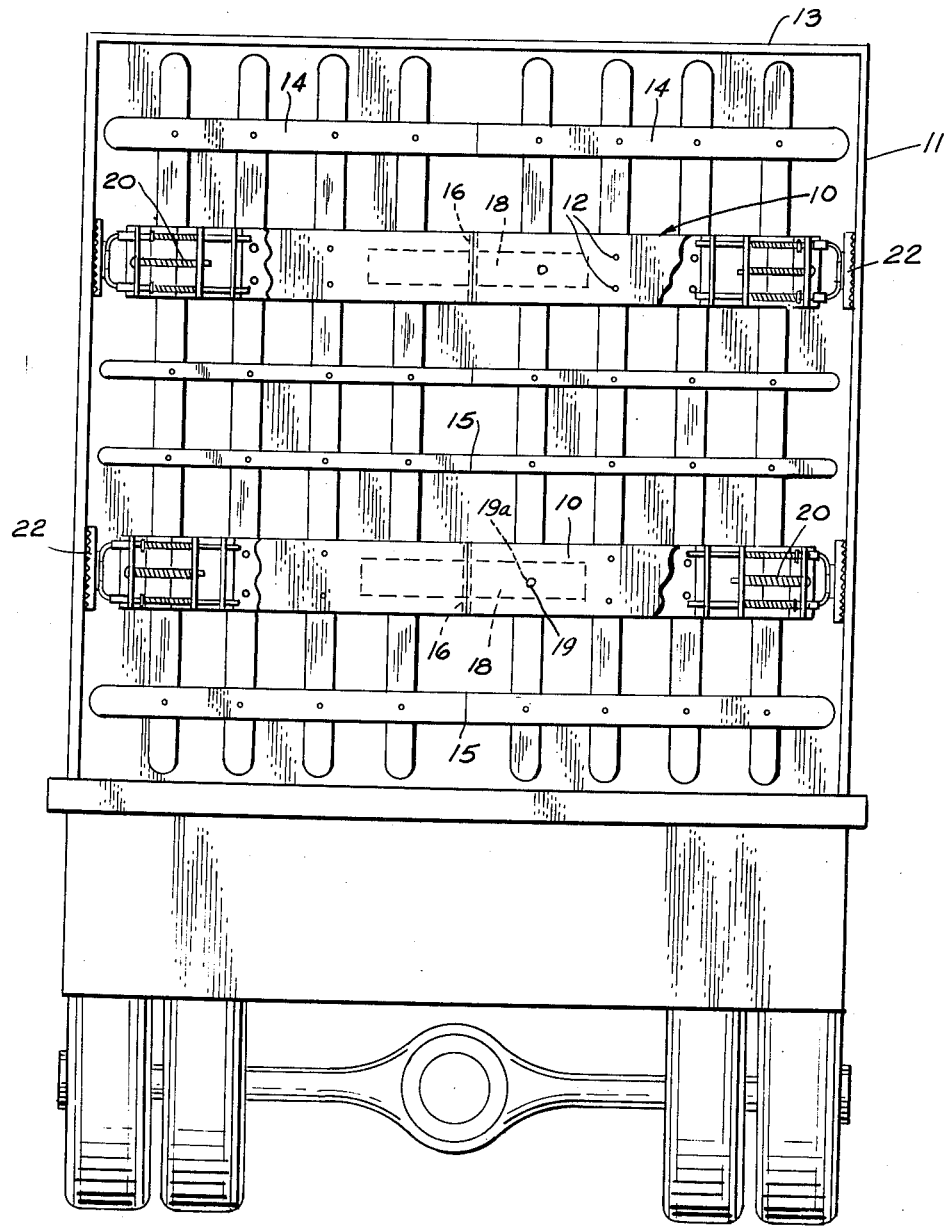
FIG. 1 is a rear view of two cargo braces attached to lattice partitions and locked into position.

In the drawings, in FIG. 1, a representative cargo space defined by side walls 11 and a top wall 13 is shown. Two folding cargo retainer bars 10 are attached by rivets 12 to separate lattice sections or partitions 14. Hinges 16 are provided so that the partitions may be folded upon themselves or extended across a cargo space supported by the toggle acting bars 10. When the bar is fully opened as shown in FIG. 1 the partitions abut at 15 to prevent the bar from bending beyond the fully straightened position and forcing the hinge. A slide 18 is carried within each bar 10 so that the bar can be secured in a straight position by moving the slide across the hinge when the bar is in the fully extended position. The bar has an opening bordered by a hole 19 and the slide 18 has a coinciding opening 19a or suitable conventional fitting (not shown) permitting the slide to be padlocked to the bar when the slide has been extended across the hinge when the holes coincide. This prevents the cargo retainer from being opened or removed. The member 18 instead of being a slide could be pivoted to overlie the fold line abutment 15 and then locked in place.

At either end of the bar there is an adjustment mechanism 20 and detachable feet 22 for engagement with the walls of the cargo space, as will be further described. The adjustment mechanism, as best shown in FIG. 2, is received within an end of the bar and mounted therein by means of a bracket 24 and shouldered screws 26 or rivets best shown in FIG. 5. The bracket is slotted with open end slots 28 to receive the screws 26 and slide in guided relationship thereon as further hereinafter described. A second bracket 30 is associated with bracket 24 and is also slidably supported within the bar. A U-shaped support bar 32 having two 90° bends 31 extends through both brackets. An adjusting shaft 34 extends through bracket 24 and extends from the bracket 24 through the bracket 30. A position retaining head 35 and a cotter key (not shown) disposed on opposite sides of bracket 24 are provided to prevent the adjusting shaft from pulling out of bracket 24 under working strains. A compression spring 36 slidably received on the adjusting shaft urges the brackets 24 and 30 apart, while an adjusting nut 38 limits the spring urged travel of bracket 30. As can be seen from the diagram in FIG. 2, adjustment of this nut calibrates the distance between the brackets 24 and 30. A window (not shown) is provided offering access for manual adjustment of nut 38 and having calibrated scale lines A, B, C and D for preadjusting the nut 38 to a known width of cargo space to obtain the proper bar length.

Slidably received on the shank portions of the U-bar 32 are duplicate spacer collars 40 which locate duplicate washers 46 which serve as shoulder stops, duplicate sleeves 42 and duplicate compression springs 44. The compression springs 44 are received within the sleeves 42 between the washers 46 and the bracket 30 and on the side of bracket 30 opposite therefrom, duplicate cotter pins 48 pass through holes in the U-bar shaft to limit travel of bracket 30 relative to the shaft under the influence of the springs. The collars 40 extend through the bracket 24 loosely to permit free travel therethrough and can be spot welded or crimped to the shafts.

If desired, only one adjustment mechanism need be used on each bar 10, and a simple compressible foot arrangement with a fixed compression limit point may be employed at the opposite end of the bar, as shown in FIG. 8 or the foot may be rigidly supported as shown in FIG. 9. In FIG. 8, a U-bar 84 is slidably received by holes 86 and 88 in brackets 90 and 92 respectively which are mounted by rivets 94 or other suitable means. The U-bar 84 has holes 96 fitted with cotter keys 98, and washers 100 and compression springs 102 are received on the U-bar shafts between the brackets 90 and 92. The bar is bent twice at 90° as shown at 104.

The foot 50 as shown in FIG. 3 has a metal back 64 which is riveted or otherwise attached to a block 68 comprised of rubber, plastic, wood or the like. The face 70 of the block is designed to provide a gripping surface with the walls of a cargo space, and may be grooved 72 or equipped with steel or rubber spikes 74, suction cups 76, or the like, as shown in FIGS. 3, 4 and 4a. The spikes or cups may be free floating in a rubber pad 77 to provide resilience during shocks and an increased gripping ability. The feet are designed to be used interchangeably as required, and are readily attachable to the straight end section 52 of the U-bar by means of a spring clip 60 which is riveted or spot welded 56 or otherwise attached to the foot as shown in FIG. 3. On the bar a partly closed tube 57 having wings 58 and crimped ends 59 which retain the tube on the bar engages the clip 60 when the wings 58 are slid under the fingers 61 of the clip. It is to be noted that the wings 58 are not parallel but are bent backwardly somewhat so that when they are inserted into the fingers 61 they will snap downwardly upon reaching the window 62 thereby locking the foot to the bar until such time as the fingers may be pried apart by a screw driver or similar tool when removal is desired. It is to be further noted that this arrangement takes up a minimum space so that the foot may retract fully into the end of the bar when necessary without interference from the clip.

The ends of U-bar 32 have large holes 78 aligned so that a straight pin may be inserted through both holes at once. The screws 26 are threaded and flared outwardly at the bottom to a diameter greater than the threaded portion. The bracket 25 is thereby retained on the screw and is in threaded engagement therewith. The function of slots 28 and special screws 26 with screw brackets 25 now become clear (FIG. 5). The entire adjustment mechanism may be removed from the end of the bar 10, providing the feet are free to move outwardly of the bar, by simply loosening screws 26 and sliding the entire mechanism out. It may then be turned around, the foot removed, and the mechanism reinserted into the end of the bar with the holes 78 projecting out. Two more screws 26 are located at holes 27 a short distance inboard of the first mentioned set of screws and after the bracket 24 has passed over them during insertion, the mechanism is pulled out again slightly and these screws will engage the slots 28 of the bracket in a direction so as to prevent the flange from being pulled outwardly. These screws are threadedly received by brackets 25 just as are screws 26 first mentioned, and when bracket 24 is slid between the screw receiving brackets 25 and the holes 27, screws 26 are tightened, securing the bracket 24.

With the adjustment mechanism installed in the reverse direction in the bar it is possible to use it in cargo spaces having fittings mounted on the interior walls by connecting the ends of the U-bar to such fittings by means of a pin 80, as shown in FIGS. 6 and 7.

This arrangement is for use with cargo spaces having walls equipped with attachment fittings. The partition may be attached at one side to the fittings on one cargo space wall and used as a gate which can be secured between cargo space walls under tension by attachment of the ends of the U-bar to the fittings on the opposite wall. The pins 80 are secured to the fittings by a chain 82 to prevent loss.

As used with feet and with the adjusting mechanism in its first described position, the invention comprises a removable folding gate which is hinged so that it can be folded flat or opened out straight. When it is desired to confine cargo to a given space by a partition between two walls of a cargo space, the folding gate is set up where the confining partition is desired and it is then opened until the projecting feet contact opposite walls. When the adjustment mechanism is calibrated for the correct width, the folded partition is set in place, wherever desired between the walls of the cargo space. It is important that the proper feet be used with the type of cargo space walls encountered, for example rubber grooved or suction cup equipped feet should be employed with smooth steel walls while the feet equipped with movably mounted spikes are designed for wooden side walls. When the hinged portions of the bar are pushed toward the cargo the feet will engage the walls and grip them. Further straightening of the bar will cause the collars 40 to abut the 90° bends 31 at the bottom of the U-bar and move inwardly with it. The collars engage the washers 46 and move them to contact the compression springs 44 which rest against the bracket 30. The bracket 30 moves back until stopped by the nut 38, which is threadedly mounted on the shaft 34. The shaft 34 is prevented from moving in the bracket 24 by the shaft head 35, and the bracket is fixedly mounted to the end of the bar by screws 26. Increase of foot pressure as the bar is straightened out then compresses springs 44 and compression continues until washers 46 bottom against sleeve 42, at which point no further compression can occur. If the nut 38 is set properly, bottoming of the washers against the sleeves 42 will occur at the precise instant that the bar is snapped into a fully straightened-out position. In this way cargo surge against the partition cannot work it loose since neither the partition nor the feet are free to shift from side to side with the spring pressure take-up present in the system and further because the ends cannot give further at either end. This also prevents tampering since the feet cannot be pried away from either wall.

When the bar is snapped into the straightened position the attached partitions abut, preventing bending of the bar beyond the straightened position, and the slide 18 is manually moved over across the hinge to prevent the bar from bending outwardly. The slide may be padlocked to the bar by a suitable fitting, thereby locking the cargo retainer in place.

If during movement of the cargo carrier the walls of the cargo compartment yield outwardly, the spring loaded feet remain strongly urged outwardly against the walls and no bar slippage relative to the walls can occur.

It is to be noted that adjustment of the nut 38 varies the distance between the brackets 24 and 30 but does not vary the distance between the washers 46 and the bracket 30. This distance remaining constant, the U-bar will always travel the same distance from initial compression of springs 44 to the bottoming of the washers 46 against sleeves 42, regardless of the setting of the nut 38 and the spring and bottoming action is uniform for all settings.

Where only one adjustment mechanism is used for each bar and the opposite ends are equipped with the previously described compressible foot arrangement, the operation is the same but only adjustment of one side of the bar is necessary. Pressure on the opposite side will force the U-bar 84 inwardly and the compression springs 102 will be compressed between the washers 100 and the bracket 92 until the 90° angled portions of the U-bar bottom against bracket 90.

Referring now to the embodiment shown in FIG. 9, a hanger rail 102 having a C-shaped cross-sectional configuration is fastened on one of the side walls 11 near the ceiling 13 with the channel opening inwardly whereby rollers 104 mounted upon axles 106 can be received therein to roll therealong in weight bearing relationship. One axle 106 is secured to and supports a flattened tubular guide member 108 as braced by cross members 110 and 112 carried by the other axle and is thereby held in a vertical position. Thus the tubular member 108 is supported for movement fore and aft along the said wall 11 as held in a perpendicular position.

In this embodiment the feet 22 at one end of the bars 10a are rigidly secured to the tubular member 108 in a position where they face and engage the wall 11 and on the side of the tubular member 108 opposite to the feet 22, hinges 114 are secured to the member 108 and support the adjacent end of the bars 10a, whereby the entire gate is supported upon the tubular member and the partitions can be folded or straightened at any position in the cargo space, the rest of the partition structure being substantially as already described.

It will be noticed in FIG. 10 that the lower hinge 114 has mounted thereover a caster roller 120 whereby the gate in its folded condition can be moved along the wall 11 without the feet 22 scuffing the wall. The height of the caster roller 120 is such that the roller bears against the side wall and fulcrums the feet out of engagement therewith when the folded gate is moved into parallel position with the side walls, thus keeping the feet clear of the wall to permit the gate to be rolled into and out of its working location.

In this particular embodiment the hanger rail 102 may be closed at its outer end so that the rollers 104 cannot then be dis-engaged therefrom, or it can be notched at suitable places so that the gate can be removed at will when folded, as when the cargo space doesn't require a partition. On the other hand if more than one gate is required, other gates can be lifted into place and moved along into position with a minimum amount of effort upon the part of persons handling the equipment. In no instance, however, when the gate is put into use properly can it be moved or budged from its working position. Furthermore, if while in its working position it is locked as by a padlock, it requires a key to gain access to the space beyond the gate.

After thus describing the invention and several embodiments thereof it will be appreciated by those skilled in the art how an improved cargo barrier, partition or gate is provided which accomplishes the objects stated at the beginning of this specification. It will further be seen how other and further changes therein can be made without departing from the spirit of the invention, the scope of which is commensurate with the appended claims.

What is claimed is:

1. A cargo barricade disposed between the side walls of a carrier comprising a folding bar, a support bar reciprocably retained in each end of the folding bar, wall engaging feet releasably secured to the outer ends of said support bar, an adjustment mechanism disposed in at least one end of the folding bar interconnecting the folding bar and said support bar to extend or retract said wall engaging feet to accommodate different width carriers and spring members disposed between said support bar and the folding bar to urge said support bar outwardly to maintain the wall engaging feet in secured contact with the side walls of the carrier at all times regardless of width changes of the carrier due to flexing of the side walls.

2. A cargo barricade disposed between the side walls of the cargo compartment of a carrier comprising a folding bar, a support bar reciprocably retained in one end of the folding bar, a first wall engaging foot releasably secured to the outer end of said support bar, a channel member horizontally secured to an upper portion of a side wall of the cargo compartment, a guide member retained in sliding and pivotal relationship within the channel member and depending vertically therefrom at right angles, the other end of said folding bar pivotally secured at right angles to said guide member, a second wall engaging foot secured to said guide member opposite said folding bar, an adjustment mechanism disposed within the folding bar interconnecting the folding bar and said support bar to extend or retract said first wall engaging foot to accommodate different width carriers and spring members disposed within said folding bar between said support bar and the folding bar to urge said support bar outwardly to maintain the wall engaging feet in secured contact with the side walls of the carrier at all times regardless of width changes of the carrier due to flexing of the side walls.

3. A cargo barricade disposed between the side walls of a carrier comprising a folding bar centrally hinged, a sliding brace member disposed over the hinge when the folding bar is in an extended straight position, a support bar reciprocably retained in each end of the folding bar, wall engaging feet pivotally secured to the outer end of said support bars, an adjustment mechanism disposed in at least one end of the folding bar interconnecting the folding bar and said support bar to extend or retract said wall engaging feet a set predetermined distance to accommodate different width carriers, spacer elements disposed on said support bar coordinating with said adjustment mechanism to defeat retraction of the wall engaging feet from the set predetermined distance and spring members disposed between said support bar and the folding bar to urge said support bar outwardly to maintain the wall engaging feet in secured contact with the side walls of the carrier at all times regardless of an increase in width of the carrier due to flexing of the side walls.

4. A cargo barricade disposed between the side walls of a carrier comprising a folding bar, a U-shaped support bar reciprocably retained in each end of the folding bar, wall engaging feet releasably secured to the bottom portion of said U-shaped support bar, a bracket member detachably secured within each end of the folding bar slidably supporting said U-shaped support bars, an adjustment mechanism disposed in at least one end of the folding bar interconnecting said bracket member and said U-shaped support bar to extend or retract said wall engaging feet to accommodate different width carriers and spring members mounted in compression between said support bar and the bracket member to urge said support bar outwardly to maintain the wall engaging feet in secured contact with the side walls of the carrier at all times regardless of width changes of the carrier due to flexing of the side walls.

5. In the combination called for in claim 4 with the removal of the wall engaging feet, said bracket member may be released, rotated 180° in the plane of the folding bar and secured to the folding bar reversing the position of the U-shaped support bar permitting the extending ends thereof to be secured to the carrier side walls with said springs in tension resisting extension.

6. A cargo barricade disposed between the side walls of the cargo compartment of a carrier comprising a folding bar centrally hinged, a sliding brace member disposed over the hinge when the folding bar is in an extended straight position, a U-shaped support bar reciprocably retained in each end of the folding bar, wall engaging feet pivotally secured to the outer end of said support bars, a bracket member detachably secured within each end of the folding bar slidably supporting said U-shaped support bars, an adjusting shaft and nut arrangement disposed in at least one end of the folding bar interconnecting the bracket member and said support bar to extend or retract said wall engaging feet a set predetermined distance to accommodate different width carriers, spacer elements disposed on said support bar coordinating with said adjusting shaft and nut arrangement to defeat retraction of the wall engaging feet from the set predetermined distance and spring members mounted in compression between said spacer elements and the folding bar to urge said support bar outwardly to maintain the wall engaging feet in secured contact with the side walls of the carrier at all times regardless of an increase in width of the carrier due to flexing of the side walls.

References Cited in the file of this patent

UNITED STATES PATENTS

| | | |
|---|---|---|
| 923,463 | Taylor | June 1, 1909 |
| 2,162,181 | Skinner | June 13, 1939 |
| 2,411,768 | Welch | Nov. 26, 1946 |
| 2,543,175 | Kilgore | Feb. 27, 1951 |
| 2,575,751 | Donnelley | Nov. 20, 1951 |
| 2,766,704 | McMahon | Oct. 16, 1956 |
| 2,788,558 | Bowers | Apr. 16, 1957 |
| 2,879,840 | Etten | Mar. 31, 1959 |
| 2,885,181 | McCully et al. | May 5, 1959 |